(12) United States Patent
Holmes (10) Patent No.: US 9,420,920 B2
(45) Date of Patent: Aug. 23, 2016

(54) BEVERAGE CONTAINER FOR ENHANCED MIXING

(71) Applicant: Nourilogic, LLC, Nokomis, FL (US)

(72) Inventor: Jordan Holmes, Nokomis, FL (US)

(73) Assignee: Nourilogic, LLC, Nokomis, FL (US)

( * ) Notice: Subject to any disclaimer, the term of this patent is extended or adjusted under 35 U.S.C. 154(b) by 392 days.

(21) Appl. No.: 13/766,403

(22) Filed: Feb. 13, 2013

(65) Prior Publication Data

US 2014/0192610 A1    Jul. 10, 2014

Related U.S. Application Data

(60) Provisional application No. 61/750,717, filed on Jan. 9, 2013.

(51) Int. Cl.
*A47J 43/27*    (2006.01)

(52) U.S. Cl.
CPC .......... *A47J 43/27* (2013.01); *B01F 2215/0022* (2013.01)

(58) Field of Classification Search
CPC . B01F 13/0022; B01F 15/00512; B65D 1/18; B65D 5/40; A47J 43/27

USPC ........ 366/130; 224/148.7; 215/382, 383, 384; 220/568, 669, 675

See application file for complete search history.

(56) References Cited

U.S. PATENT DOCUMENTS

| | | | | |
|---|---|---|---|---|
| D319,183 | S * | 8/1991 | Halm | D9/552 |
| 5,547,275 | A * | 8/1996 | Lillelund et al. | 366/130 |
| D386,401 | S * | 11/1997 | Prestia et al. | D9/552 |
| 5,908,127 | A * | 6/1999 | Weick et al. | 215/373 |
| 6,662,964 | B2 * | 12/2003 | Higuchi | 220/667 |
| D529,389 | S * | 10/2006 | Trude | D9/538 |
| 7,426,839 | B2 * | 9/2008 | Beaudry | 62/457.3 |
| 2005/0184027 | A1 * | 8/2005 | Floyd et al. | 215/384 |
| 2007/0068894 | A1 * | 3/2007 | Iwashita | B65D 1/0223 215/382 |
| 2009/0311775 | A1 * | 12/2009 | Kocourek et al. | 435/289.1 |
| 2010/0032405 | A1 * | 2/2010 | Ozawa | B65D 79/005 215/383 |
| 2010/0089865 | A1 * | 4/2010 | Oguchi | B65D 1/42 215/382 |
| 2011/0011874 | A1 * | 1/2011 | Kurosawa | B65D 1/0223 220/665 |

* cited by examiner

*Primary Examiner* — Charles Cooley
*Assistant Examiner* — Marc C Howell
(74) *Attorney, Agent, or Firm* — Riverside Law LLP (57) ABSTRACT

The present invention relates to a beverage container with a helical or spiral shape. The container of the present invention provides efficient and effective mixing of ingredients without the need for additional parts or components to facilitate mixing.

13 Claims, 6 Drawing Sheets

BEVERAGE CONTAINER FOR ENHANCED MIXING

CROSS-REFERENCE TO RELATED APPLICATIONS

The present application claims priority under 35 U.S.C. 119(e) to U.S. Provisional Patent Application No. 61/750,717, filed Jan. 9, 2013, which is herein incorporated by reference in its entirety.

BACKGROUND OF THE INVENTION

The mixing of ingredients for use as a beverage can be problematic, especially in cases where a powder and a liquid are being mixed. A utensil, such as a whisk or spatula, can be used to stir ingredients in a cup to create a beverage. However, this results in the need to clean the utensil after use, in addition to the cup. For example, an object, such as a wire-frame ball or some type of agitator, can be inserted into a beverage container to attempt to improve mixing when the container is shaken. However, the use of such objects in beverage containers is not ideal because the object must be removed for cleaning; the object can be lost if it is not attached to the container; or the object can cause damage to the container by colliding with the interior surface of the container.

Alternatively, if a utensil is unavailable, for example when a person is away from home, mixing can be performed by shaking the cup. However, cups or containers presently in the art do not provide efficient and thorough mixing of ingredients, and mixing ingredients with these cups or containers requires the expenditure of excess energy by the user.

Accordingly, there is a need in the art for a beverage container that can be used to efficiently and effectively mix ingredients without the need for additional parts aside from the container itself, and yet is also easy to clean. The present invention addresses this unmet need in the art.

SUMMARY OF INVENTION

The present invention relates to a beverage container with a spiral or helical shape that can be used to effectively and efficiently mix ingredients. The beverage container comprises a base; a container body extending from said base, wherein said container body comprises at least three sides, and wherein said container body has a substantially helical shape; and a brim portion extending from said container body suitable for securing a removable cap thereto. The present invention also relates to a method of mixing at least two ingredients in a container, wherein the container is the helical beverage container as described herein.

The beverage container of the present invention may further comprise a lid, for example a twist cap, and may also comprise a handle. The body of the beverage container may comprise any number of sides or panels. In a preferred embodiment, the container body of the beverage container comprises six sides.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical beverage containers. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

The terms "helix," "helical," "spiral," "spiraled," and the like are used interchangeably herein, and refer to a generally coil-like or twisted shape. The helical shape of the present invention may be "right-handed" or "left-handed."

The terms "container," "cup," "vessel," "bottle," and the like are used interchangeably herein, and refer to an object or receptacle for holding and mixing ingredients.

The present invention relates to a beverage container with a spiral shape that can be used to thoroughly and efficiently mix ingredients. The device of the present invention does not require extra parts to facilitate mixing, but instead allows for enhanced mixing due to the shape of the device. The device can be used to mix ingredients for a number of applications, such as preparing beverages or medications.

The container or vessel of the present invention is a device for the efficient and effective mixing of beverage ingredients. The body of the container may have a spiraled shape that improves and enhances the ability to mix ingredients. The preferred spiral or helical shape of the container improves mixing in comparison to containers with other shapes because the configuration of the interior surface of the container produces a baffle-like effect. The sides and ridges of the interior surface of the container of the present invention direct and/or obstruct the flow of material in the container during mixing, which results in the ingredients being thoroughly dispersed. The helical or twisted shape of the walls of the container increases the amount of disruptive contact with the ingredients that are desired to be mixed, thereby enhancing agitation of the ingredients when the container is shaken.

The container of the present invention can be used to mix ingredients to form a beverage, which is then poured into a separate glass, cup, or container. The container of the present invention can also be used as a cup or bottle itself, whereby after the ingredients are mixed, the resulting beverage is imbibed or ingested directly from the container.

The method of using the container of the present invention is simple. Ingredients, such as a powder and a liquid, are placed in the container. The container is then shaken, swirled, vibrated or otherwise moved in some manner, thereby causing the ingredients to mix together inside the container.

The container of the present invention has many advantages over mixing devices presently available because the container does not require any parts other than the container itself Other devices or bottles used for mixing can require moving parts, such as agitators, blades, or some other type of object inserted into the container, that moves or obstructs the material that is desired to be mixed. These additional parts can be lost because they may need to be removed in order to properly clean the bottle. In addition, such additional parts can cause damage or wear to a bottle when these parts come into contact with the bottle during mixing, thereby reducing the durability and integrity of the bottle. On the other hand, the container of the present invention requires no such additional parts to enact efficient and thorough mixing of ingredients. Further, cleaning the container of the present invention is easier than other bottles presently available due to the lack of such additional parts. In addition, the fact that the device of the present invention does not require extra parts to enable enhanced mixing allows for more simplistic manufacturing than other devices that require mixing elements separate from the container itself.

The container of the present invention can be used to mix various types of ingredients thoroughly and efficiently. For instance, the container can be used to mix a solid, such as a protein powder or a dietary fiber supplement powder with a liquid, such as water or milk. The container may also be used to mix liquids with other liquids, such as mixing simple syrup with rum to make a cocktail beverage. In addition to being used to make beverages, the device of the present invention can be used to mix ingredients for other uses, such as to prepare medicines, or to mix chemicals in a laboratory. The container of the present invention may be used with ingredients that will result in a solution after mixing. Alternatively, the container may be used with ingredients that are not completely soluble or miscible with each other, but instead result in a well-dispersed and/or substantially homogenous mixture. For example, the container may be used for mixing two or more normally immiscible liquids to form an emulsion; for mixing non-polar components with polar components; or for mixing multiple components to form colloidal suspensions, colloidal solutions, or gels. Further, the container may be used to mix ingredients that are dispersed only temporarily, for example when mixing a solid with a liquid to form a slurry. However, the device of the present invention is not limited to only the uses or ingredients discussed herein. Therefore, the container can be used to mix any type of system comprising multiple components, as would be understood by a person skilled in the art.

In one embodiment, the device of the present invention is a container with a spiraled or helical shape. The spiral may consist of any number of sides, for example 3, 4, 5, 6, 7, 8, 9, 10, or more than 10 sides. The sides can be substantially equivalent in size or diameter, or can be variable, or a combination thereof. In a preferred embodiment, the container is in the shape of a six-sided, i.e. hexagonal, spiral. In another embodiment, the container may further comprise a lid. In yet another embodiment, the container may comprise a handle or other means for holding the container.

In a preferred embodiment, the body of the container of the present invention has an inner surface and an outer surface, wherein the shape of the inner surface is substantially equivalent to the shape of the outer surface. However, in other embodiments, the body of the container of the present invention may have an inner surface in the shape of a helix, while the shape of the outer surface is different from the shape of the inner surface. In one such embodiment, the inner surface is helically shaped while the outer surface is in the shape of a substantially smooth cylinder or cone, i.e. non-helically shaped. In another such embodiment, the outer surface is substantially smooth, and has no ridges or other surface features. In yet another such embodiment, the outer surface is configured to be held by a person's hand, for instance wherein the outer surface has a region or more than one region that is configured to be a hand grip, i.e. to facilitate ergonomic handling by the user. In various other embodiments, the body of the container is substantially conical in shape, but the enhanced mixing characteristics of the container are created by one or more helical or spiral ridges or grooves on the inner surface of the body of the container.

In various embodiments, the device of the present invention may further comprise additional components or features that a skilled artisan would recognize to be necessary or beneficial for optimal use of the device. Such additional components or features could include, but are not limited to: seals for preventing leakage during mixing, such as a gasket or o-ring on the container or in the lid; a clip, strap, or other means for attaching the device to a person's clothing or other personal item, such as a gym bag; or insulation or other means for maintaining the ingredients inside the container at a substantially constant temperature, for example to keep a beverage hot or cold.

The embodiments of the present invention can be composed of various types of materials. For instance, the container of the present invention may be composed of any type of polymer or composite, such as polypropylene, polyethylene, polystyrene, or silicone. Further, the container may be composed of a metal, such as aluminum. Preferably, the present invention will be formed from a material suitable for contacting beverages or for medical applications, as would be understood by those skilled in the art. In one embodiment, the container of the present invention is composed of a plastic that is free of bisphenol A (BPA) or other harmful chemicals that could leach into ingredients inside the container. In addition, at least a portion of the container may be coated with a material to provide chemical resistance or some other desirable property. However, the present invention is not limited to any specific composition described herein.

The present invention features a low manufacturing cost basis, due to its simplicity of design, and because it may be readily molded. Those of ordinary skill in the molding art may readily select the appropriate materials from various available materials. Alternatively, the present invention may be manufactured using 3D printing techniques.

Figure 1:
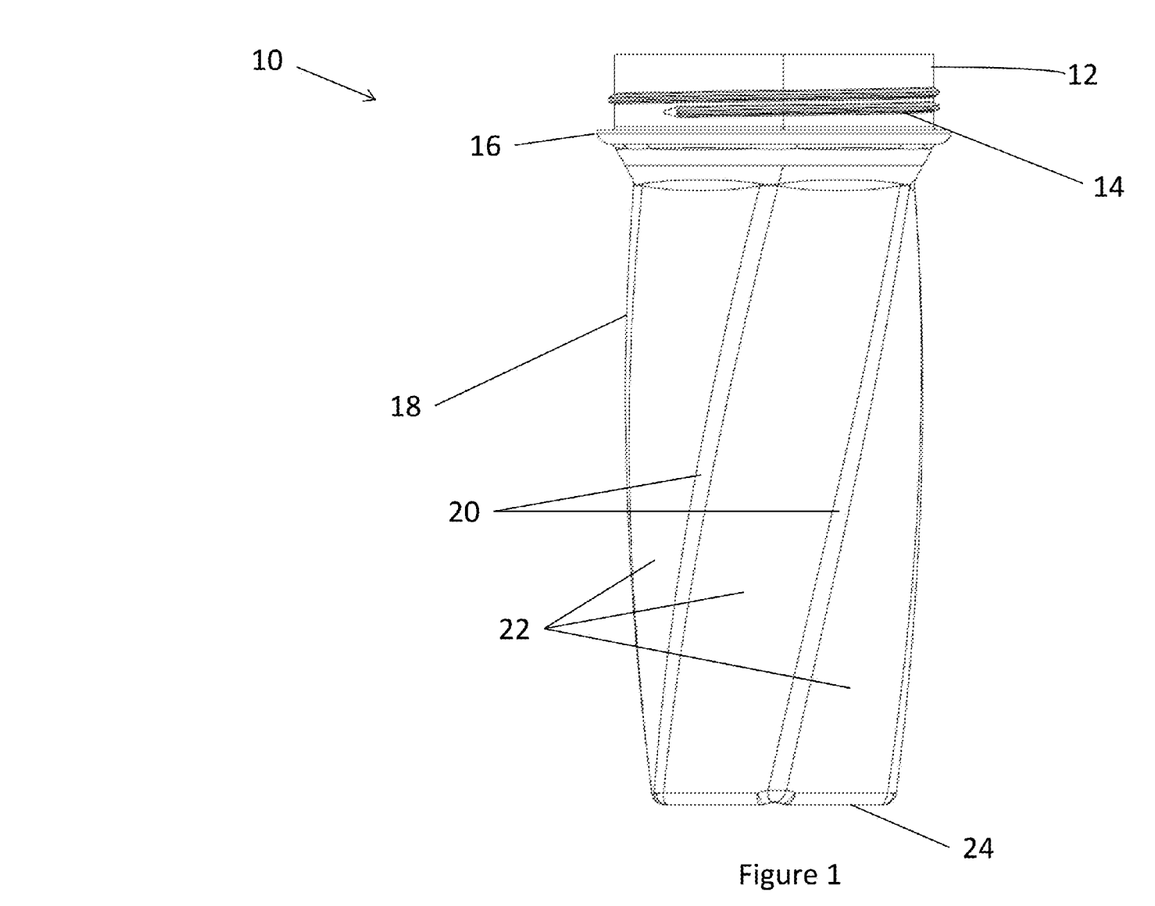
FIG. 1 depicts a side view of a helical beverage container.

Referring to FIG. 1, an embodiment of the helical container 10 of the present invention is shown. A container body 18 extends from a base 24. Container body 18 comprises sides 22, wherein the intersection of two sides 22 forms a ridge 20.

Sides 22 and ridges 20 form the generally helical or spiral shape of container body 18. A brim portion 12 extends from container body 18. Brim portion 12 comprises a lip 16 and a thread 14. Thread 14 coils around a region of the outer surface of brim portion 12 to provide a structure for attaching a lid.

In another embodiment of the present invention, the brim portion of the container may be substantially smooth, i.e. devoid of a thread for use in affixing a lid. In yet another embodiment, the brim portion of the container may be configured for attaching a lid by way of a friction fit, or by way of another means other than friction-fit or a thread, as would be contemplated by a person of reasonable skill in the art.

Figure 2:
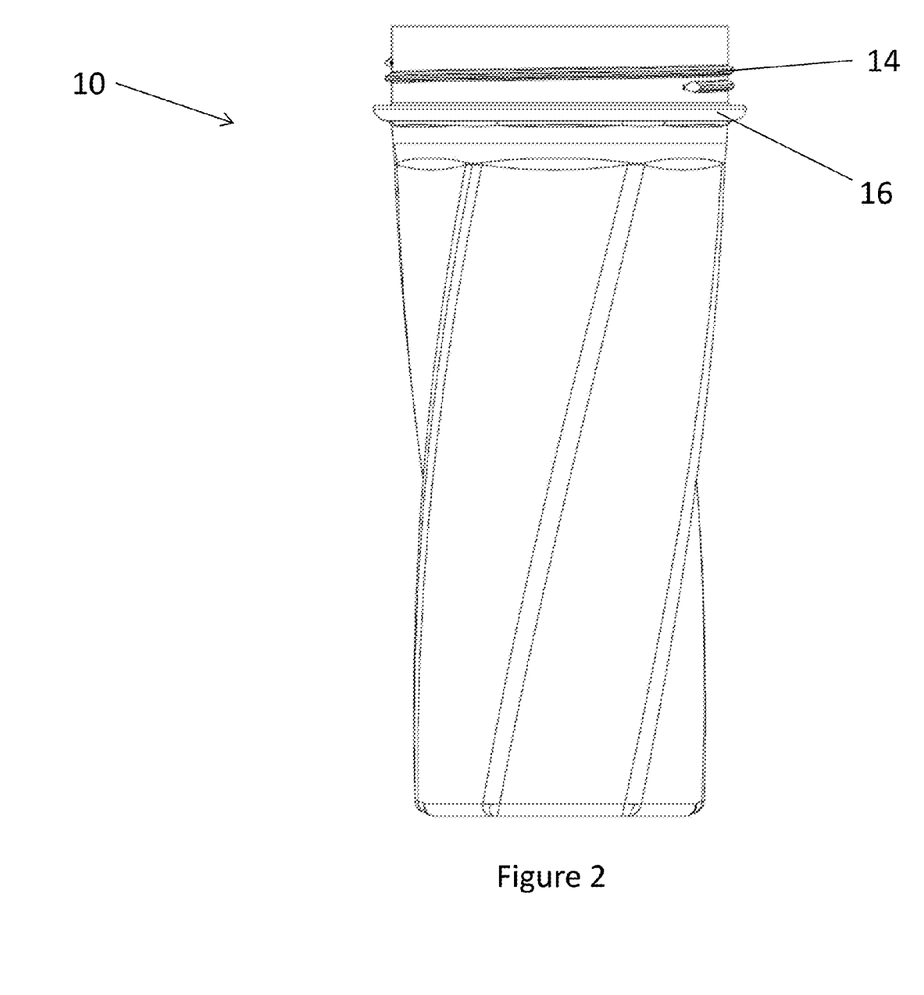
FIG. 2 depicts another side view of a helical beverage container.

Referring to FIG. 2, another view of helical container 10 is shown, depicting a different portion of thread 14. Lip 16 may be configured to form a seal with the various embodiments of lids that may be used in conjunction with helical container 10.

Figure 3:
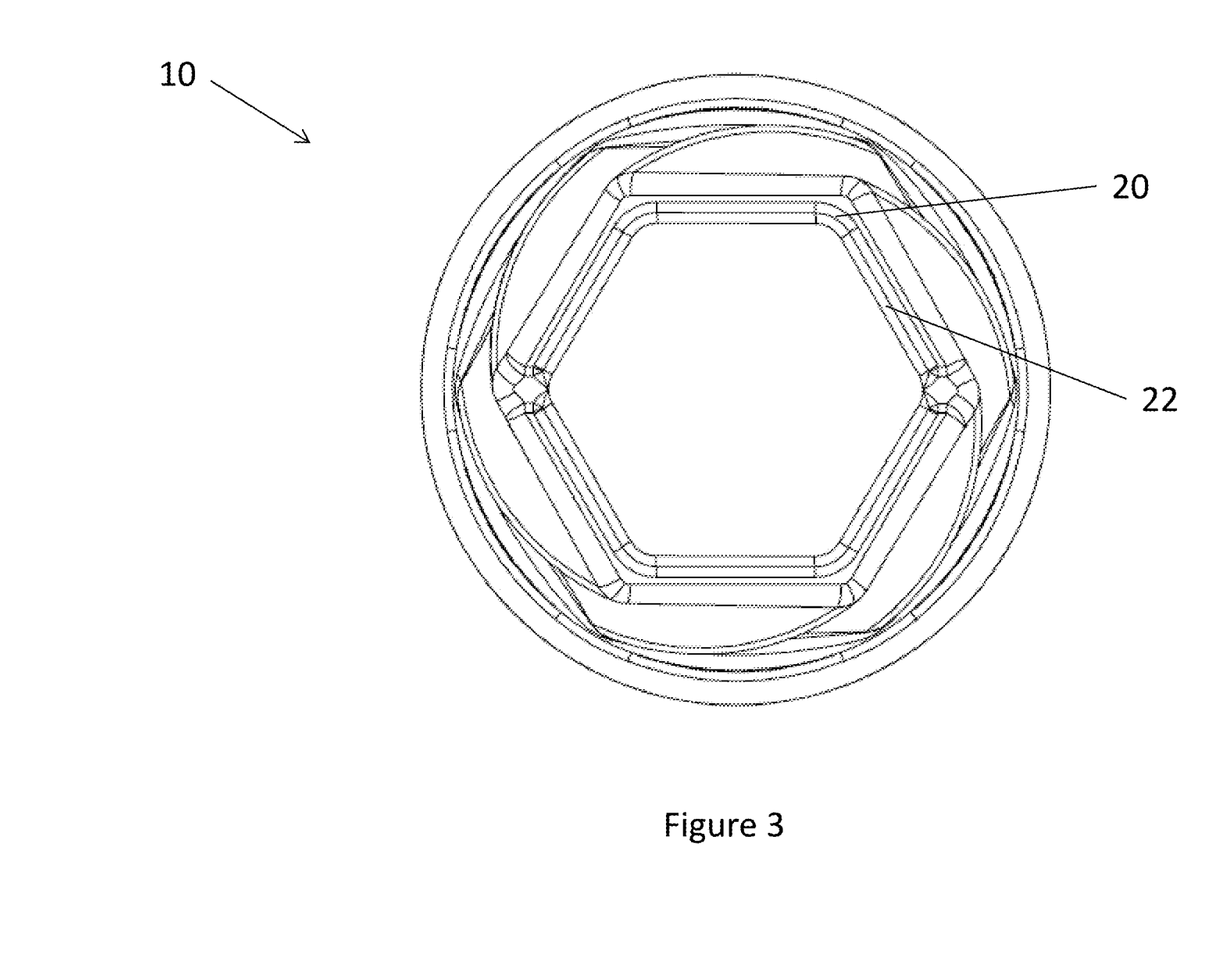
FIG. 3 depicts a top view of a helical beverage container.

Referring to FIG. 3, a top view of helical container 10 is shown, depicting an inner surface of helical container 10 with six sides 22 and corresponding ridges 20. As previously discussed herein, alternative embodiments of the present invention may have a different number of sides. The inner surfaces of sides 22 and ridges 20 enable helical container 10 of the present invention to provide thorough and efficient mixing of ingredients.

Figure 4:
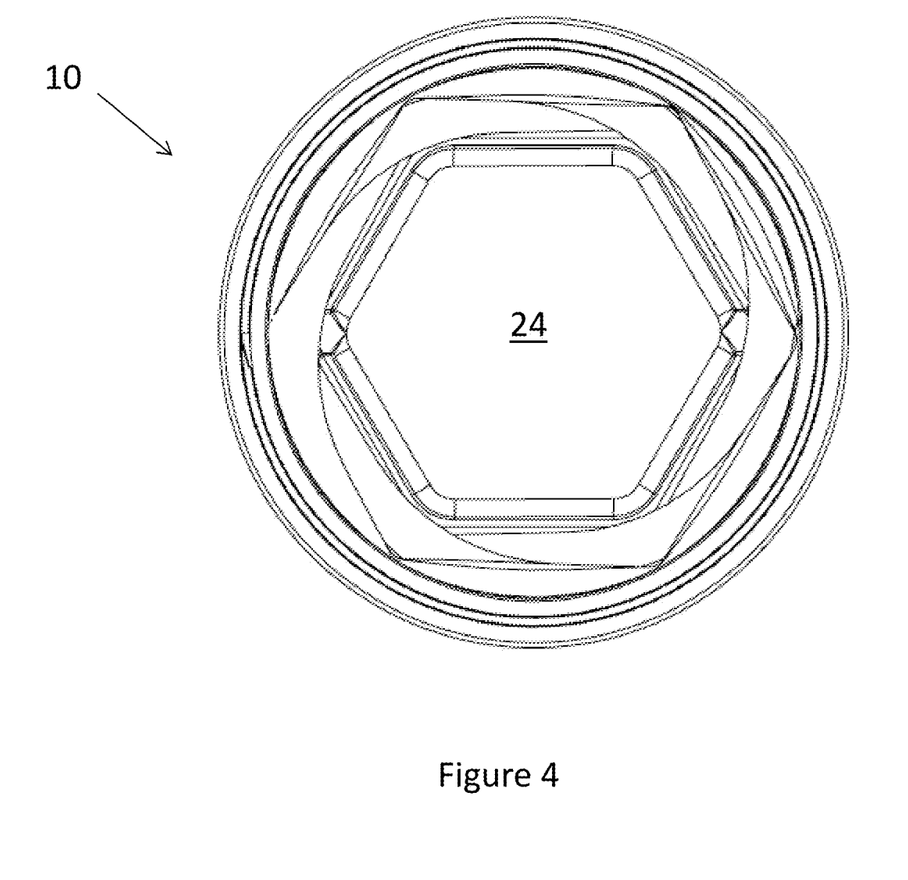
FIG. 4 depicts a bottom view of a helical beverage container.

Referring to FIG. 4, a bottom view of helical container 10 is shown, depicting base 24 which allows helical container 10 to rest in a stable manner on a flat surface.

Figure 5:
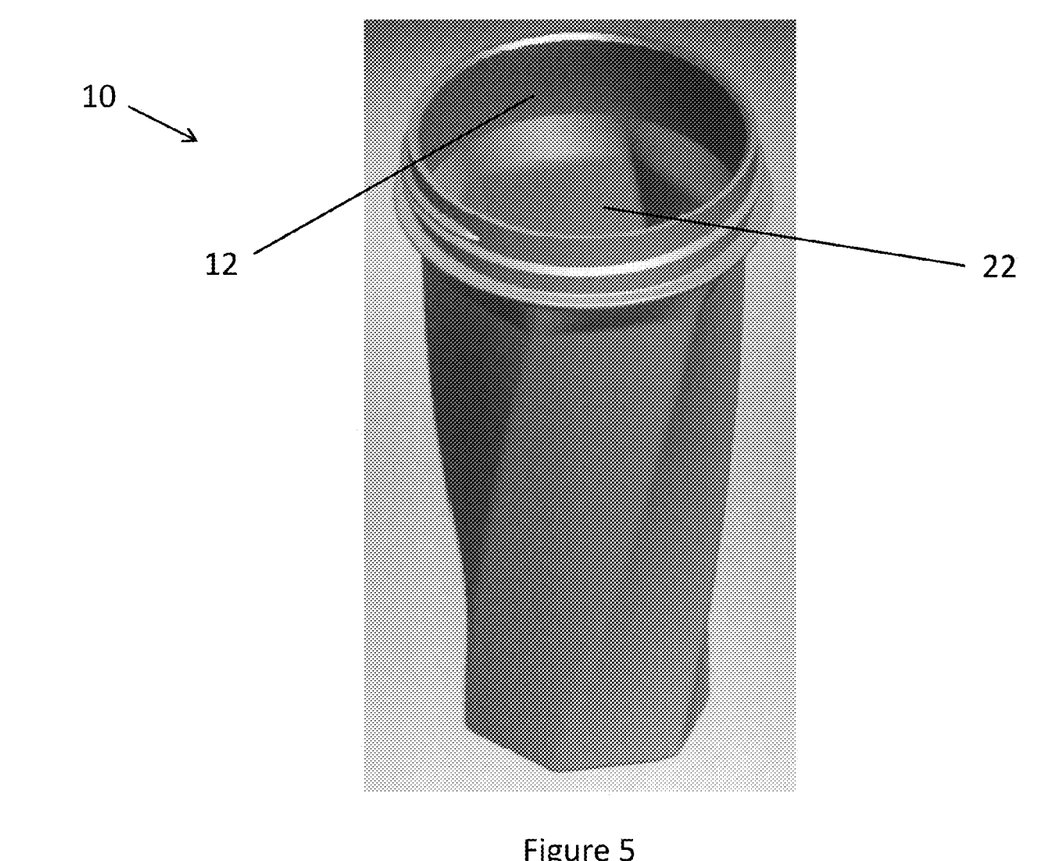
FIG. 5 depicts a perspective view of a helical beverage container.

Referring to FIG. 5, a perspective view of an image of helical container 10 is shown, wherein the inner surface of brim portion 12 and the inner surface of side 22 is visible.

Figure 6:
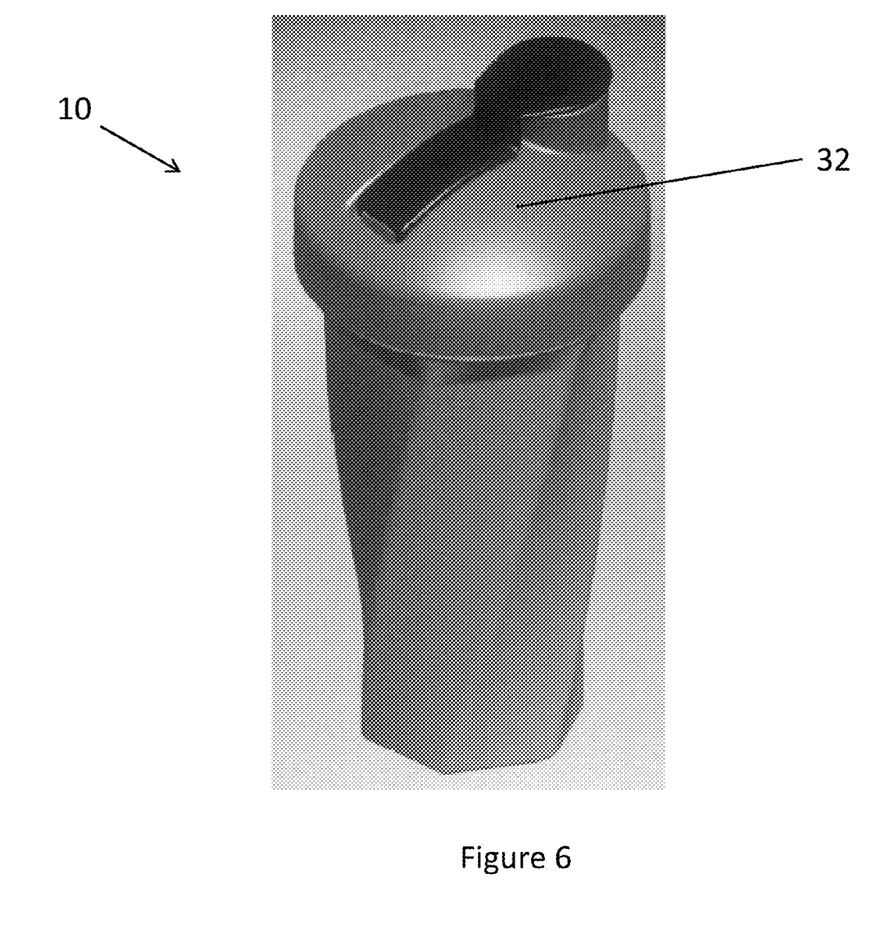
FIG. 6 depicts another perspective view of a helical beverage container, with an embodiment of a lid affixed to said helical beverage container.

Referring to FIG. 6, another view of an image of helical container 10 is shown, wherein an embodiment of a lid 32 is affixed to helical container 10. As previously discussed herein, any type of lid may be used with helical container 10, as would be understood by a person reasonably skilled in the art.

The disclosures of each and every patent, patent application, and publication cited herein are hereby incorporated herein by reference in their entirety.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A method of mixing at least two ingredients in a container comprising:
   providing a beverage container without a mixing insert, the beverage container comprising:
      a base,
      a container body extending from said base, wherein said container body comprises at least three interior sides separated by ridges,
      a brim portion extending from said container body suitable for securing a removable cap thereto, said brim portion defining a brim opening, and
      a twist cap configured to attach to said brim portion and block fluid access through the brim opening,
      wherein said container body has a substantially helical interior surface shape comprising the at least three interior sides extending from said base to said brim portion, and
      wherein a cross section of the brim opening is at least as large as any cross section of the interior of the container body;
   depositing a first and second ingredient into the container; and
   shaking the container to mix the first and second ingredient via interior surfaces comprising the substantially helical interior surface shape, the base and the twist cap, wherein the substantially helical interior surface shape, the base and the twist cap directs and obstructs the flow of material during the mixing to increase disruptive contact and enhance agitation of the first and second ingredients.

2. The method of claim 1, wherein the container body comprises six interior sides.

3. The method of claim 1, wherein interior surface walls of the substantially helical interior surface form an opening that increases in size along a portion of the container body moving away from the base.

4. The method of claim 1, wherein the width of each of the at least three interior sides increases along a portion of the container body moving away from the base.

5. The method of claim 4 further comprising six interior sides; wherein a first interior side twists parallel to a second interior side along substantially the entire container body, a third interior side twists parallel to a fourth interior side along substantially the entire container body, and a fifth interior side twists parallel to a sixth interior side along substantially the entire container body.

6. The method of claim 5, wherein the first, second, third, fourth, fifth and sixth interior sides are each substantially flat.

7. The method of claim 5, wherein the first, second, third, fourth, fifth and sixth interior sides have substantially the same geometry.

8. The method of claim 5, wherein a cross section of interior sides of the container is substantially hexagonal.

9. The method of claim 1, wherein a cross section of a top interior of the container body has an area larger than a cross section of a bottom interior of the container body.

10. The method of claim 1, wherein interior sides and ridges of the container body twist at a substantially equal and constant rate along a majority of container body.

11. The method of claim 1, wherein adjacent interior ridges of the container are equally spaced apart at cross sections of the container body.

12. A method of mixing at least two ingredients in a container comprising:
   providing a beverage container without a mixing insert, the beverage container, comprising:
      a base,
      a container body extending from said base, wherein said container body comprises at least three interior sides of substantially equal width at cross sections of the container body,
      a brim portion extending from said container body suitable for securing a removable cap thereto, said brim portion defining a brim opening, and
      a twist cap configured to attach to said brim portion and block fluid access through the brim opening,
      wherein said container body has a substantially helical interior surface shape comprising the at least three interior sides extending from said base to said brim portion, and
      wherein a cross section of the brim opening is at least as large as any cross section of the interior of the container body;
   depositing a first and second ingredient into the container; and
   shaking the container to mix the first and second ingredient via interior surfaces comprising the substantially helical interior surface shape, the base and the twist cap, wherein the substantially helical interior surface shape, the base and the twist cap directs and obstructs the flow of material during the mixing to increase disruptive contact and enhance agitation of the first and second ingredients.

13. The method of claim 12, wherein the width of each of the at least three interior sides increases concomitantly moving away from the base along a portion of the container body.

* * * * *